Oct. 24, 1933.    V. TANASSO ET AL    1,931,635
COMBINED LENS RIM JOINT AND NOSE GUARD CONNECTION FOR EYEGLASS FRAMES
Filed June 14, 1932
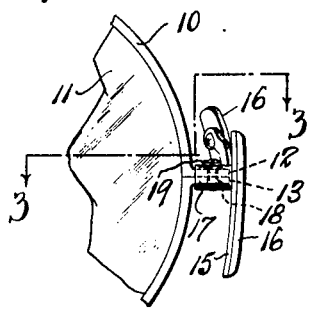
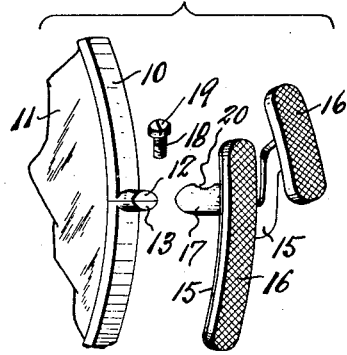
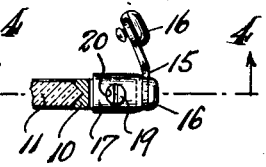
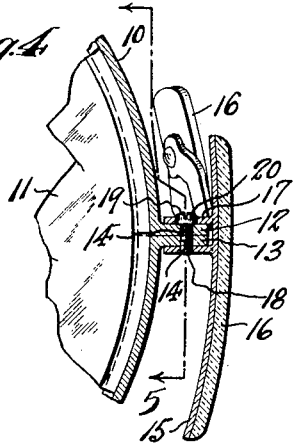
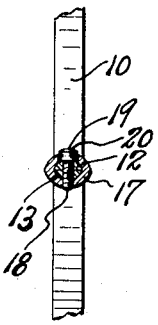
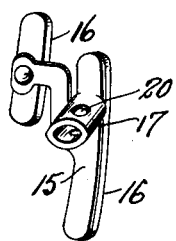
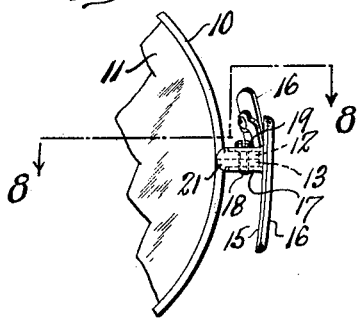
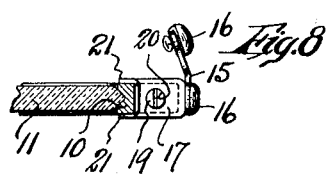
INVENTOR
Vincent Tanasso & Jacob J. Pomeranz,
BY George D. Richards
ATTORNEY Patented Oct. 24, 1933

1,931,635

UNITED STATES PATENT OFFICE 1,931,635

COMBINED LENS RIM JOINT AND NOSE-GUARD CONNECTION FOR EYEGLASS FRAMES

Vincent Tanasso, Harrison, and Jacob J. Pomeranz, Brooklyn, N. Y.

Application June 14, 1932. Serial No. 617,073

2 Claims. (Cl. 88—42)

This invention relates to an improved lens rim joint for eye-glass frames of various kinds.

The invention has for its principal object to provide a novel means for joining and securing together the meeting ends of discontinuous lens encircling and holding rims of eye-glass frames, while at the same time providing an attaching connection for mounting nose-guard or other elements upon said rims.

The invention has for a further object to provide a rim joint structure including a locking screw, said structure being of such nature as to greatly facilitate the operation of setting said screw, while at the same time operating to prevent accidental loosening or displacement of the screw once the same is set, so that a firm and rigid assembly is provided easily capable of withstanding the stresses and strains consequent upon the use of the eye-glasses by the wearer.

Another object of the invention is to provide a combined lens rim joint and nose-guard connection of very neat and pleasing appearance, and of such nature that all metal parts are prevented from contacting with the nose of the wearer of the eye-glasses.

Other objects of this invention, not at this time more particularly enumerated, will become apparent in the following detailed description of the same.

Illustrative embodiments of this invention are shown in the accompanying drawing, in which:—

Fig. 1 is a fragmentary face view of a discontinuous lens rim provided with one form of the novel joint and coupling connection according to this invention; Fig. 2 is a perspective view of disassembled parts making up the novel joint and nose-guard connection; Fig. 3 is a horizontal section, somewhat enlarged, taken on line 3—3 in Fig. 1; Fig. 4 is a vertical longitudinal section, taken on line 4—4 in Fig. 3; Fig. 5 is a transverse vertical section, taken on line 5—5 in Fig. 4; and Fig. 6 is a perspective view of the nose-guard element of the structure.

Fig. 7 is a fragmentary face view of a discontinuous lens rim provided with a somewhat modified form of the novel joint and coupling connection, embodying, however, the principles of this invention; and Fig. 8 is a horizontal section of the same, taken on line 8—8 in Fig. 7.

Similar characters of reference are employed in the hereinabove described views, to indicate corresponding parts.

Referring to the drawing, the reference character 10 indicates a lens rim of an eye-glass frame. The rim 10 is discontinuous, i. e. the same is provided with separable meeting ends, which, when secured together, contract the rim to embracing and holding relation to the periphery of a lens 11. Fixedly connected with and respectively projecting radially outward from the perimeter of the rim 10, respectively at the meeting ends thereof, are lugs or ears 12 and 13, which abut in meeting relation when the rim ends are closed together. These lugs are provided with screw threaded openings 14 which are brought into alignment when the lugs are closed together in abutting relation.

The reference character 15 indicates the baseplate of a nose-guard means to which are suitably attached or mounted non-metallic facings or pads 16 to contact with the nose of the wearer of the eye-glasses. The form of said base plate 15, and the facings or pads 16 carried thereby, is subject to more or less variation as to shape and make-up, but, whatever the specific or selected form may be, there is fixedly connected to the back of the base plate 15, for rearward lateral projection therefrom, a tubular or box-like member 17 open at its free end.

When the rim 10 is closed around the lens 11 so that the lugs or bars 12—13 are brought together in superimposed meeting relation, the box-like member 17 of the nose-guard member is slid telescopically over the thus disposed lugs or ears 12—13 so as to embrace or enclose the same, thus retaining the same against separation and consequently preventing the rim 10 from opening up or loosening its embrace relative to the lens 11 surrounded thereby. Such application of the box-like member 17 to the lugs or ears 12—13 has the initial advantage of holding the rim 10 closed in embracing relation to the lens 11 pending the setting of a fastening screw, thus greatly facilitating the operation of applying such screw in place. Such fastening screw is indicated by the reference character 18, and the screw is preferably provided with an enlarged head 19. One wall of the box-like member 17 is provided with an opening 20 which, when the box-like member is applied over the lugs or ears 12—13, aligns with the screw-threaded openings 14 of the latter. This opening 20 is of a diameter corresponding to that of the screw head 19, so that the latter may countersink therein, when the screw is turned home through the threaded openings 14 of the lugs or ears 12—13, thereby so engaging the box-like member 17 as to secure the same against withdrawing displacement from the lugs or ears 12—13, while at the same time further binding the latter against separation and consequent opening up of the rim 10 relative to its desired operative holding relation to the lens 11. It will also be obvious that the box-like member 17, by reason of its close fitting surrounding embrace of the closed-together lugs or ears 12—13, prevents vibratory spreading movements of the latter with relation one to the other, which if permitted tends to loosen the fastening screw engaged therewith.

As shown in Figs. 1 to 6 of the drawing, the closed together lugs or ears 12—13 and the corresponding box-like member 17 may be made of elliptical or oval cross-sectional shape, thereby giving an appearance of comparative thinness to these parts as assembled, and consequently providing a very simple and neat appearing connection between the rim 10 and the nose-guard means. While such shape is desirable for the reasons given, it is not intended that the parts be limited to such cross-sectional shape, since they may be of rectangular or other cross-sectional shape within the broad aspects of this invention. An arrangement of such rectangular cross-sectional shape is shown in Figs. 7 and 8 of the drawing. The disclosure of Figs. 7 and 8 also shows another modification in the shape of the box-like member 17, viz. the provision at the respective sides of its free ends of lap-ears 21 which, when the member 17 is assembled upon the lugs or ears 12—13, will overlap the adjacent sides of the rim 10, thereby further reenforcing and bracing the assembled parts in their operative interengaged and connected relations.

It will be understood that the invention, in its broadest aspect, comprehends a lens rim joint and coupling connection not limited alone for combination with a nose-guard means, but capable of combination with any other form or kind of frame part desired to be coupled to a discontinuous lens rim at the joint thereof.

We are aware that many changes could be made in the above disclosed constructions, and many apparently widely different embodiments of this invention could be made without departing from the scope thereof. It is therefore intended that all matter contained in the above description or shown in the accompanying drawing shall be interpreted as illustrative and not in a limiting sense.

We claim:—

1. A joint for discontinuous lens rims of eyeglass frames, comprising lugs projecting respectively from the ends of a rim and adapted to close together in superimposed meeting relation when said rim is contracted around the periphery of a lense, a unitary hollow box-like member having a closed end and an open free end, said member being telescopically engaged over the closed-together lugs in holding relation thereto, said lugs having aligned openings at least one of which is internally threaded, a fastening screw having a head, a wall of said member having a screw head receiving opening aligned with said lug openings, said fastening screw being threaded into said lug openings with its head positioned in said receiving opening of said box-like member, and a nose-guard means fixedly connected to said box-like member and adapted to be coupled by the latter to said rim.

2. A joint for discontinuous lens rims of eyeglass frames, comprising lugs projecting respectively from the ends of a rim and adapted to close together in superimposed meeting relation when said rim is contracted around the periphery of a lens, a unitary hollow member telescopically engaged over the closed together lugs in holding relation thereto, said lugs having internally threaded aligned openings, a fastening screw having a head, a wall of said member having a screw head receiving opening aligned with said lug openings, said fastening screw being threaded within said lug openings with its head received in said receiving opening of said member, and a nose-guard means fixedly connected to said member and adapted to be coupled by the latter to said rim.

VINCENT TANASSO.
JACOB J. POMERANZ.